July 25, 1950  J. J. PILLIOD  2,516,414
FISH SCALER WITH HOOD
Filed Feb. 20, 1948
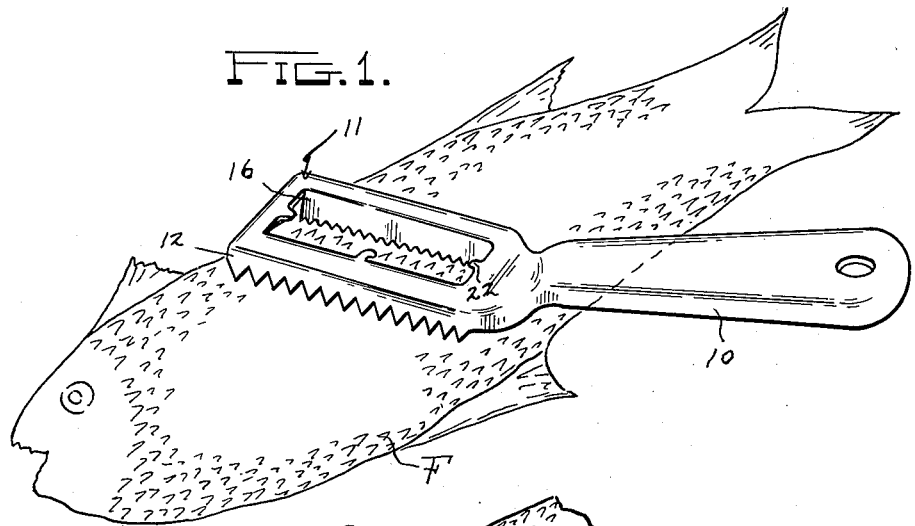
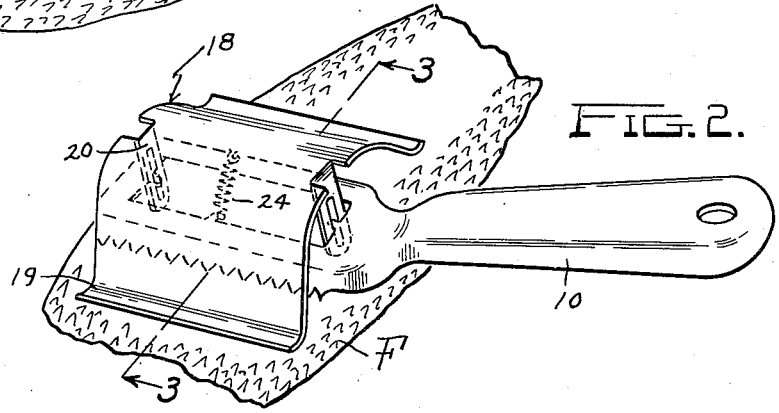
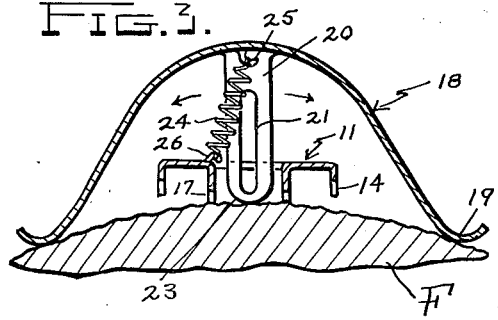
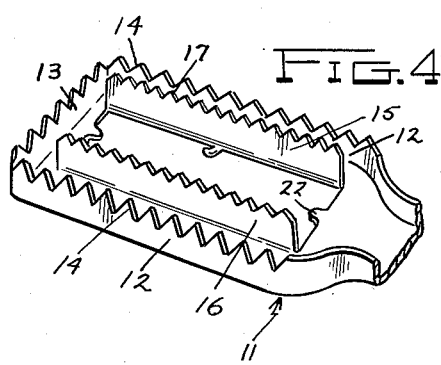
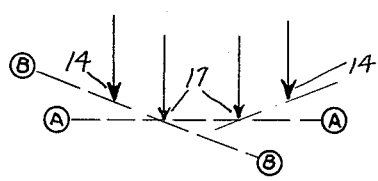
INVENTOR.
Jules J. Pilliod
BY
ATTORNEY Patented July 25, 1950

2,516,414

UNITED STATES PATENT OFFICE 2,516,414

FISH SCALER WITH HOOD

Jules J. Pilliod, Toledo, Ohio

Application February 20, 1948, Serial No. 9,770

4 Claims. (Cl. 17—7)

This invention relates to fish scalers but more particularly to a hand operated tool by which scales can be scraped from the body of a fish.

An object is to produce a simple and efficient fish scaler which is adapted readily for use in removing large or small scales as the case may be, the tool being readily and conveniently adaptable for the different sizes of scales.

Another object is to produce a fish scaler equipped with a hood or shield for preventing scales from being thrown about during the scaling operation, such hood or shield being adapted automatically to conform to the contour of the fish being scaled.

A further object is to produce a new and improved fish scaler which can economically be produced from stampings thereby lending to large scale production, the same having the unique features of construction, arrangement and operation hereinafter described.

For purposes of illustration but not of limitation, an embodiment of the invention is shown on the accompanying drawings in which:

Figure 1 is a top perspective view of the fish scaler in position of use;

Figure 2 is a top perspective view of the fish scaler in use showing the same equipped with a hood or guard mounted thereon;

Figure 3 is an enlarged transverse sectional view substantially on the line 3—3 of Figure 2;

Figure 4 is a fragmentary bottom perspective view of the scaler head showing the arrangement of teeth; and Figure 5 is a schematic view showing particularly the relative arrangement of the teeth and indicating the different ways in which the scaler may be used.

The illustrated embodiment of the invention comprises a scaler formed from a sheet metal stamping and having an elongate handle 10 and an integral head 11. The edge portions of the head 11 are flanged downwardly to provide side flanges 12 and an integral end flange 13. The flanges 12 and 13 are formed with teeth 14 which are relatively coarse for use in removing relatively large scales from fish.

Struck from the body of the head 11 and bent downwardly at substantially right angles therefrom in parallel relationship to the side flanges 12 are tongues 15 and 16. On the lower edges of the tongues 15 and 16 are formed series of teeth 17 which are considerably smaller and shorter than the teeth 14. The teeth 17 project downwardly a short distance beyond the teeth 14, as indicated particularly on Figure 3. Thus by holding the scaler level, as indicated on Figure 3, and moving to and fro in the usual manner, the smaller scales may be removed from the body of the fish F, the teeth 14 in this instance remaining spaced from the fish body. This is schematically illustrated on Figure 5 by the broken line A. By tilting the scaler in one direction or the other, one set or the other of the coarser teeth 14 may be used, or by engaging the fish, as indicated by the broken line B, both the coarse teeth 14 and the adjacent row of finer teeth 17 may be brought into use. A still further way in which the scaler may be used is by a rocking motion as the scaler is moved over the body of the fish. In this manner, the several rows of teeth are successively brought into use, as will be readily understood.

As shown, the scaler is provided with a guard or shield 18 which is also of sheet material having an arcuate body portion to fit over the top of the scaler and extend laterally a substantial distance beyond opposite sides thereof as shown in Figure 3. The edges are curled upwardly as indicated at 19 to provide runners to ride freely along the body of the fish during scaling operations. It will be observed that the shield 18 extends a substantial distance above the scaler and on opposite ends are integral downwardly bent fingers 20 provided with vertically elongate slots 21 to receive tits 22 projecting inwardly from the body of the scaler into the opening formed by the tongues 15 and 16. Thus the shield is guided vertically and has a lost motion connection with the scaler, the lower ends of each finger being rounded as indicated at 23 in order to ride freely over the body of the fish.

For resiliently urging the shield into engagement with the body of the fish, a helically coiled spring 24 has its upper end in engagement with a hook 25 on the under side of the top of the shield and its lower end engaging a hook 26 integral with the body of the scaler and projecting laterally into the opening formed by the tongues 15 and 16 centrally thereof.

From the above description, it will be manifest that as the scaler is used during its scaling operation, the shield is resiliently held in intimate contact with the body of the fish regardless of the irregularities thereof or the movement of the scaler, whether the same is used in a straight, lateral motion, or in a rocking motion.

The advantages of the above tool will be manifest. It lends itself for use in scaling different fish—those that have large scales, as well as those with smaller scales. A level to and fro movement may be employed, thereby to make effective use of the smaller teeth or a tilting movement to make use of the coarser or coarser and smaller teeth. Also the convenient rocking motion may be employed to utilize the several sets of teeth. The shield automatically accommodates itself to the contour of the fish and prevents the scales from flying upon the person of the operator. The shield accomplishes its purpose, regardless of the position of the scaler. It is further to be recognized that the structure may be produced inexpensively from sheet metal stampings on large scale production.

It is to be understood that numerous changes in details of construction, arrangement and operation may be effected without departing from the spirit of the invention especially as defined in the appended claims.

What I claim is:

1. A fish scaler comprising a sheet metal body having downwardly extending laterally spaced parallel, longitudinally extending flanges, relatively coarse teeth on said flanges, the teeth on both flanges being coplanar, a pair of laterally spaced parallel tongues integral with and extending downwardly from the body in the region between said flanges, said tongues extending substantially beyond extremities of said coarse teeth, and relatively fine teeth on said tongues respectively and disposed in coplanar relation.

2. A fish scaler comprising a sheet metal body having downwardly extending laterally spaced flanges, teeth on said flanges disposed in coplanar relation, said body having a central aperture, tits projecting into said aperture from said body, a shield fitting over said body and having downwardly extending side portions to engage the body of the fish to be scaled, downwardly extending fingers on opposite ends of said shield and extending into said aperture, vertically elongate slots in said fingers receiving said tits respectively, and a spring connecting said shield and body urging the shield at all times into engagement of the fish body.

3. A fish scaler comprising a sheet metal body having downwardly extending laterally spaced flanges, teeth on said flanges disposed in coplanar relation, said body having a central aperture, tits projecting into said aperture from said body, a shield fitting over said body and having downwardly extending side portions to engage the body of the fish to be scaled, upwardly curved edges on said shield to enable same to ride freely over the fish body, downwardly extending fingers on opposite ends of said shield and extending into said aperture, rounded end portions on said fingers adapted to ride over the fish body, vertically elongate slots in said fingers receiving said tits respectively, and a spring connecting said shield and body urging the shield at all times into engagement of the fish body.

4. A fish scaler comprising a sheet metal body having downwardly extending laterally spaced flanges, teeth on said flanges disposed in coplanar relation, a shield fitting over said body and having downwardly extending side portions to engage the body of the fish to be scaled, means providing a lost motion connection between said shield and said body enabling vertical movements thereof relative to the body, and a spring urging said shield toward said body.

JULES J. PILLIOD.

REFERENCES CITED

The following references are of record in the file of this patent:

UNITED STATES PATENTS

| Number | Name | Date |
|---|---|---|
| 787,037 | Hackett et al. | Apr. 11, 1905 |
| 1,000,073 | Clarke | Aug. 8, 1911 |
| 1,440,960 | Brown et al. | Jan. 2, 1923 |
| 1,706,403 | Huot | Mar. 26, 1929 |
| 2,109,859 | Cope | Mar. 1, 1938 |
| 2,435,351 | Hay | Feb. 3, 1948 |